United States Patent [19]

Borgmeyer et al.

[11] Patent Number: 5,189,257
[45] Date of Patent: Feb. 23, 1993

[54] TRANSFORMER HAVING AN INTEGRAL CABINET WITH A CLAMPING COVER HINGE

[75] Inventors: Virgil L. Borgmeyer, Meta; Chester F. Trice, Jefferson City; Dale A. Tempco, Jefferson City; Thomas F. Clark, Jefferson City; William J. Ritter, Tebetts; Leo H. Hueste, Jefferson City, all of Mo.

[73] Assignee: ABB Power T&D Company, Inc., Blue Bell, Pa.

[21] Appl. No.: 665,556

[22] Filed: Mar. 5, 1991

[51] Int. Cl.$^5$ .............................................. H05K 5/00
[52] U.S. Cl. ...................................... 174/50; 220/334; 336/90; 174/52.1
[58] Field of Search ................... 336/90, 94; 220/4.02, 220/334, 337, 338, 339, 340; 174/50, 52.1

[56] References Cited

U.S. PATENT DOCUMENTS

| | | |
|---|---|---|
| 1,557,454 | 10/1925 | Hammer . |
| 3,815,701 | 6/1974 | Mayhew ............................... 180/69 |
| 4,437,529 | 3/1984 | Fralish ................................. 180/69 |
| 4,717,216 | 1/1988 | Hornak ................................ 312/257 |
| 4,963,696 | 10/1990 | Owen et al. ........................... 124/50 |

Primary Examiner—Leo P. Picard
Assistant Examiner—Bot Ledinh
Attorney, Agent, or Firm—Woodcock Washburn Kurtz Mackiewicz & Norris

[57] ABSTRACT

A transformer having an integral cabinet with an apparatus for hinging and clamping the cover of the cabinet onto its base is provided. The hinge is formed by an L-shaped member extending from a lip surrounding a planar top formed in the cover. A flange having rearward and downward extending portions extends from the rear wall of the cabinet base. The hinge engages a slot formed in the downward extending portion of the flange. The distance from the hinge to the cover top is less than the distance from the slot to the upper edge of the rear wall on which the cover top rests. Thus, rotation of the cover into the closed position with the hinge engaged causes elastic deformation of the hinge, thereby creating a spring force which clamps the cover onto the base. Elastic deformation in the flange imparts addition clamping force. Sufficient clearance is provided for this elastic deformation by either sloping the rearward extending portion of the flange or sloping the planar top of the cover.

18 Claims, 5 Drawing Sheets

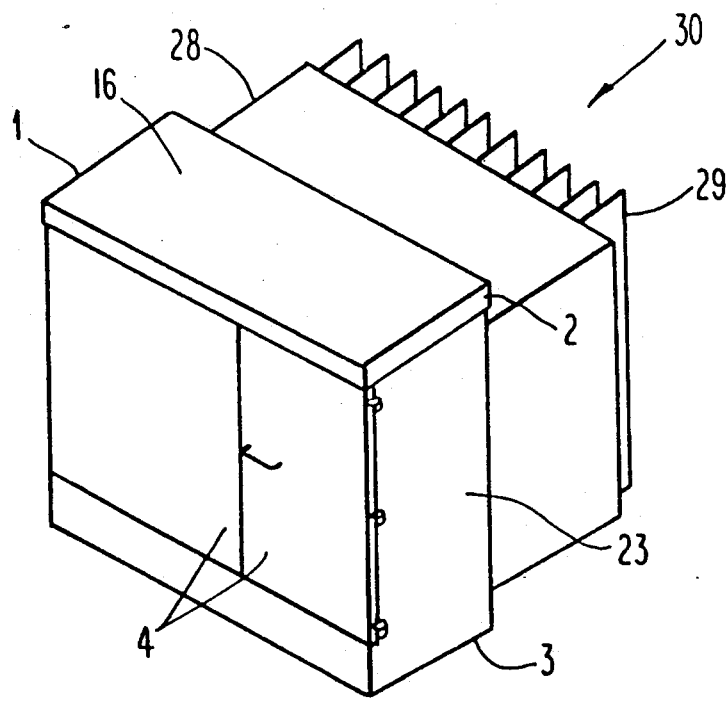
Fig. 1
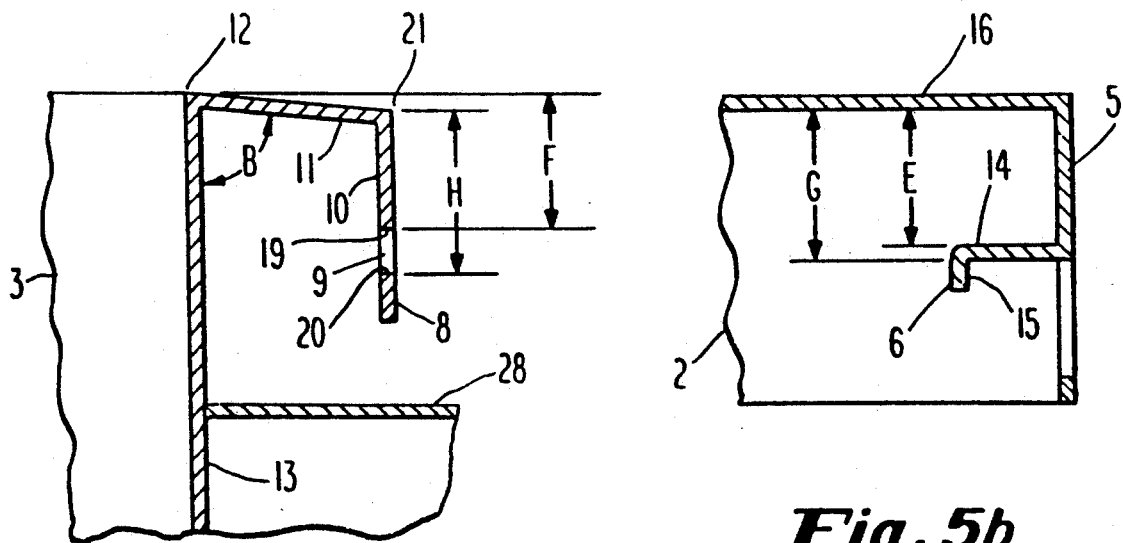
Fig. 5a
Fig. 5b

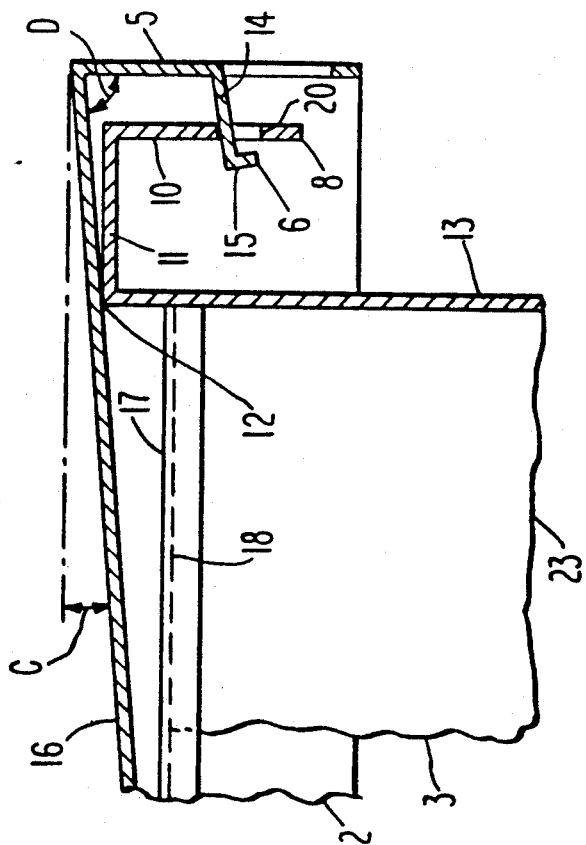
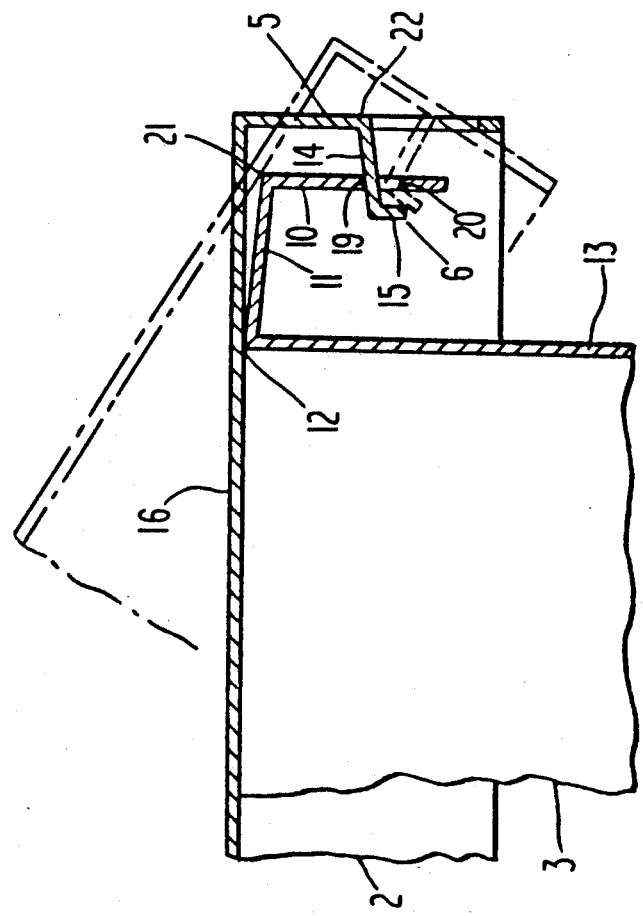
Fig. 4a
Fig. 4b

TRANSFORMER HAVING AN INTEGRAL CABINET WITH A CLAMPING COVER HINGE

BACKGROUND OF THE INVENTION

The current invention relates to a transformer having an integral cabinet with an apparatus for hinging and clamping the cover of the cabinet onto the base of the cabinet.

Transformers for commercial and residential electrical service are typically mounted on the ground external to the structures served by the transformer. As a result, the cabinets enclosing such transformers must be weather tight and resistant to tampering by small children and vandals. According to some electrical codes, any gaps in the cabinet must be so small as to preclude penetration by a wire having a diameter of 0.152 cm (0.060 inch) or more. The problem of providing such a secure cabinet is made difficult by the fact that, when necessary, there must be sufficient access to the cabinet internals to allow installation, maintenance and servicing of the transformer.

Traditionally, transformer cabinets are supplied with a cover which is attached to the base by a barrel and pin-type hinge. Unfortunately, the accumulation of tolerances associated with this type of hinge often resulted in unacceptably large gaps being formed between the cover and base, thereby destroying the weather tight and tamper resistant nature of the cabinet. In addition, the installation of such hinges is labor intensive. Accordingly, it would be desirable to provide a hinge apparatus which facilitated, rather than prevented, the weather tight and tamper resistant nature of the cabinet and which was easy to assemble.

SUMMARY OF THE INVENTION

It is an object of the current invention to provide a transformer having an integral cabinet with a cover which firmly clamps onto the base of the cabinet.

It is another object of the current invention to provide a cabinet hinge which applies a spring force to clamp the cover onto the base by elastic deformation of the hinge.

It is still another object of the current invention to provide two supporting points for the cover in the open position so that the cover is stably maintained in the open position.

These and other objects are accomplished in a transformer having an integral cabinet having a base, a cover and a hinge. The base has a rear wall which forms a first approximately horizontally extending lateral edge. A first approximately vertically extending member is attached to the rear wall. The cover has a planar top adapted to rest on the first horizontally extending edge of the base. A second approximately vertically extending member extends downward from the top. A hinge extends from the second vertically extending member of the cover and is adapted to engage a slot formed in the first vertically extending member of the base. The slot has a second approximately horizontally extending edge which is in contact with an approximately horizontally extending surface of the hinge. The vertical distance from the second horizontally extending edge of the slot to the first horizontally extending edge of the base is less than the distance from the horizontally extending surface of the hinge to the cover top when the hinge is in an undeformed state. As a result, the engaged hinge is elastically deformed when the cover is closed and the top rests on the horizontally extending edge, whereby the hinge applies a spring force clamping the top of the cover onto the first horizontally extending edge of the base.

BRIEF DESCRIPTION OF THE DRAWINGS

FIG. 1 is an isometric view of the cabinet according to the current invention.

FIG. 4(a) and 4(b) are cross-sections through line IV—IV shown in FIG. 3.

FIGS. 5(a) and (b) are partial cross-sections through the cover and base shown in FIG. 4.

DESCRIPTION OF THE PREFERRED EMBODIMENT

Figure 2:
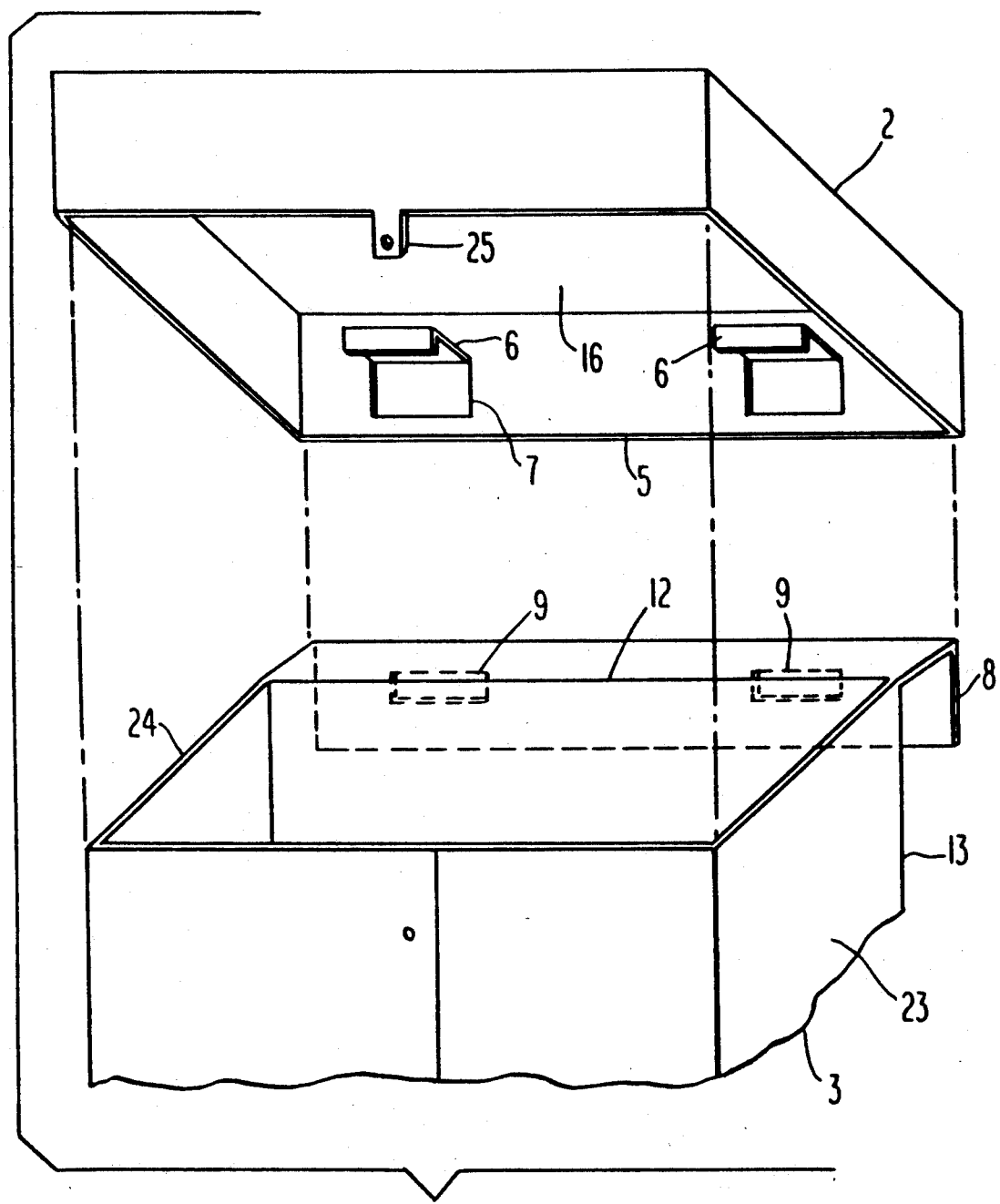
FIG. 2 is an isometric exploded view of the cover and base of the cabinet shown in FIG. 1.
Figure 3:
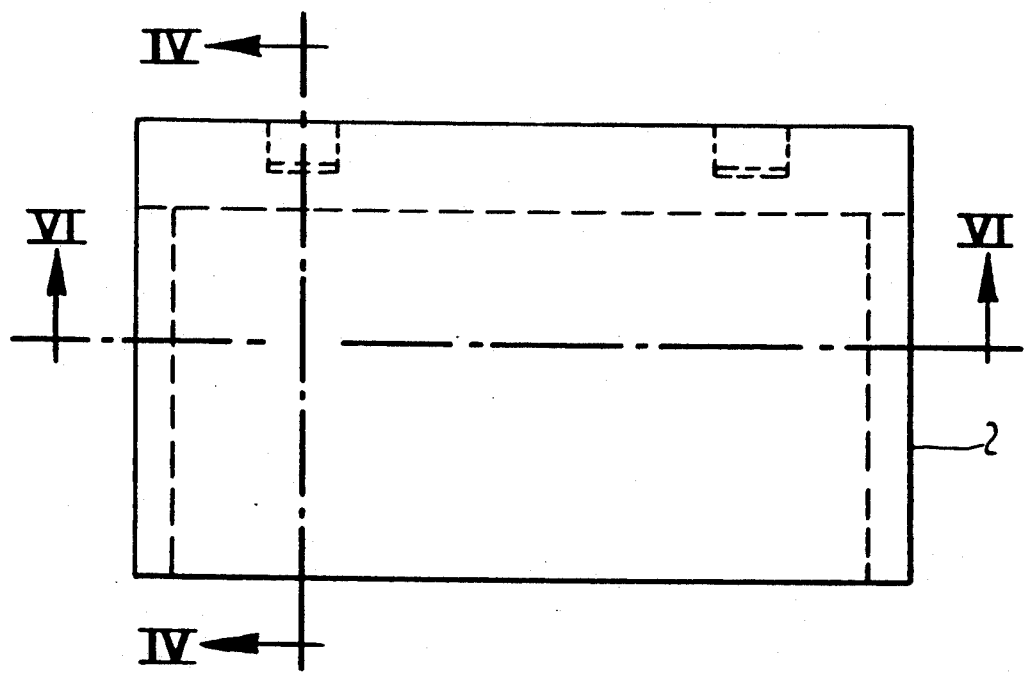
FIG. 3 is a plan view of the cabinet shown in FIG. 1.

There is shown in FIG. 1 a transformer 30 having an integral cabinet 1 according to the current invention. The cabinet 1 extends from a transformer oil tank 28, which contains the transformer coils (not shown) and has fins 29 extending therefrom, so that the transformer front panel forms the rear wall 13 of the cabinet 1. In addition, the cabinet 1 is comprised of a cover 2, base 3 and side walls 23, 24. Doors 4 are formed in the front of the cabinet 1 to provide access to the transformer for installation, maintenance and service.

The cover 2 has a planar top 16 extending over the base 3 and is hinged to the base 3 to provide additional access to the transformer. As shown in FIG. 2, two hinges 6 extend inward from a lip 5 extending vertically downward from the top 16. In the preferred embodiment, the hinges 6 are formed by making a cut-out 7 in the lip 5 and bending the cut-out material into an L-shape, as shown in FIG. 2. However, the hinges 6 could also be formed by separate Z-shaped members welded to the lip 5 along one leg of the Z. In either case, as shown in FIG. 5(b), the hinge 6 has a horizontally inward extending member 14 and a downward extending member 15 forming a hook thereon. A latch 25 is formed on the front edge of the lip 5 for securing the cover 2 to the base 3.

As shown in FIG. 2, the top of the rear wall 13 forms a horizontally extending edge 12. A flange 8 extends rearwardly from the rear wall edge 12. As shown in FIG. 5(a), the flange 8 is comprised of a vertically downward extending member 10 connected to the edge 12 by a rearward extending member 11. Slots 9, having upper and lower horizontal edges 19 and 20, respectively, are formed in the flange 8 and aligned with the hinges 6. The hinges 6 are engaged into the flange 8 by positioning the cover 2 at an angle, shown in phantom in FIG. 4(a), and sliding the cover forward so that the hinges 6 penetrate into the slots 9. The cover is then rotated downward causing the hinges 6 to rotate in the slots 9. Thus, the hinge 6 extends between the lip 5 and the flange 8 with the upper surface of the horizontally extending hinge member 14 resting against the upper slot edge 19. A plastic guard strip (not shown) may be applied to the slot upper edge 19 to prevent abrasion and wear as a result of contact with the hinge 6.

As shown in FIG. 4(a), when the cover 2 is rotated downward and held in place by the latch 25, the top 16 rests on the edge 12 at the top of the rear wall 13 of the base 3. According to an important aspect of the current invention, the distance E (shown in FIG. 5(b)) between the upper surface of the horizontally extending hinge member 14 and the inside surface of the top 16 is less than the distance F (shown in FIG. 5(a)) between the slot upper edge 19 and the edge 12 at the top of the rear wall 13. As a result, when the hinges 6 are engaged in the slots 9 and the cover 2 is rotated downward so that the top 16 rests on the edge 12, as shown in FIG. 4(a), the hinge is elastically deformed—that is, the horizontally extending member 14 bends downward about point 22 under the force applied by the upper horizontal edge 19 of the slot 9.

Figure 7:
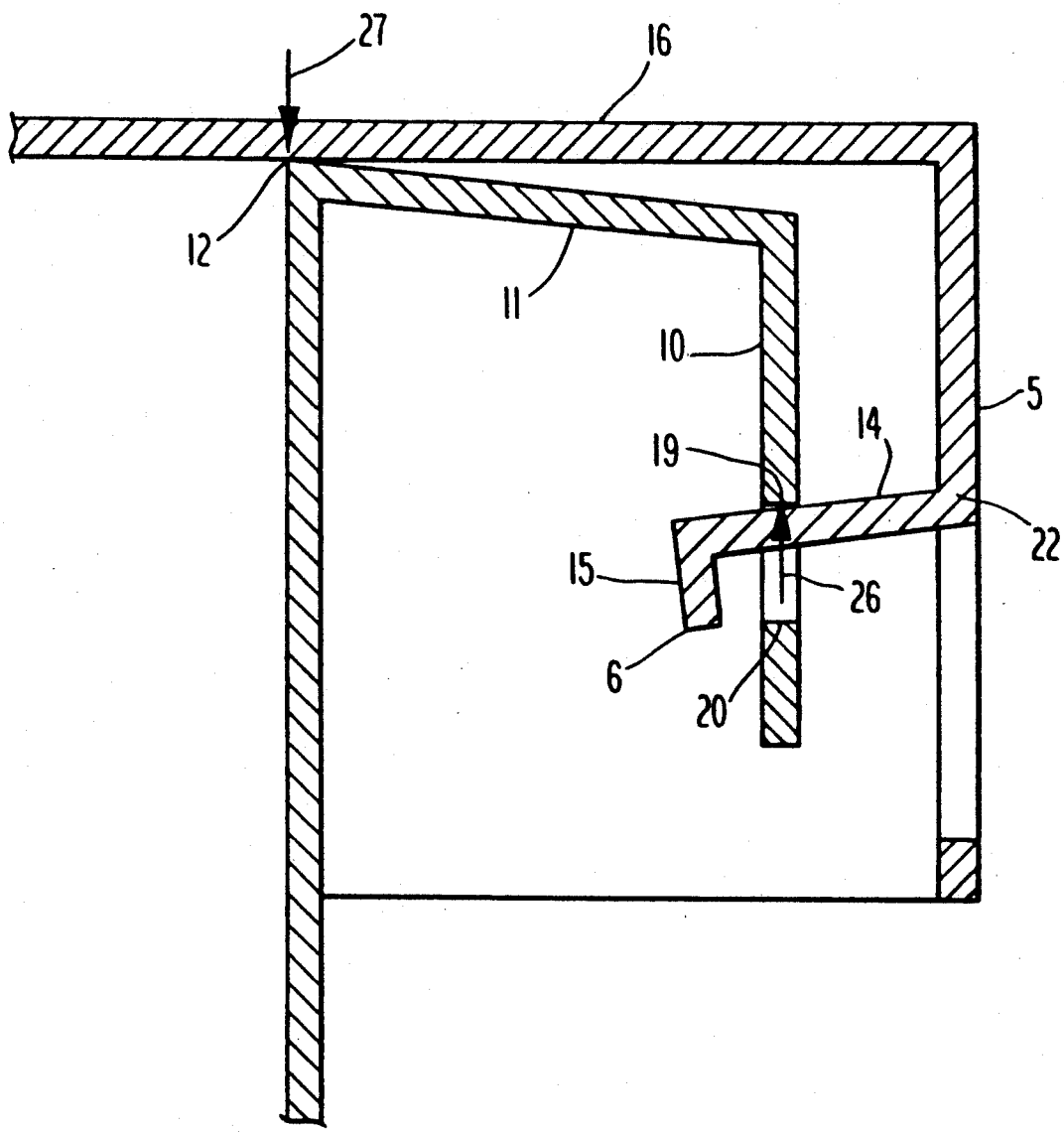
FIG. 7 is a detail of the hinge portion of the cabinet shown in FIG. 4(a).

Essentially, the hinge 6 and top 16 form opposing members which are forced apart by the flange 8. As shown in FIG. 7, the hinge 6 resists deformation by generating a spring force 26 applied to the slot upper horizontal edge 19. The spring force 26 is resisted by a force 27 applied to edge 12 which acts to clamp the cover 2 downward onto the base 3. In the preferred embodiment, the hinges 6, like the remaining portions of the base 3, as well as the cover 2, are formed from 0.229 cm (0.090 inch) thick steel. Consequently, the elastic deflection of the hinges 6 generates a considerable spring force which clamps the top 16 against edge 12 at the top of the rear wall 13, as well as against the top edges at the sides and front of the base 3, thereby forming a tight seal between the cover 2 and base 3.

As shown in FIG. 5(a), the rearward extending flange portion 11 slopes downward as it extends rearward so that the portion 11 forms an acute angle B with the rear wall 13. In the preferred embodiment, the angle B is approximately 80°. As a result of this arrangement, there is clearance between the flange 8 and the top 16. This clearance allows the rearward extending portion 11 of the flange 8 to bend upward about the edge 12 in response to force 26 generated by the horizontally extending hinge member 14. Thus, both the hinges 6 and the flange portion 11 elastically deform when the cover is rotated downward into the closed position, the deformation of each member being a function of the relative stiffness of each. As a result, the flange portion 11 generates a second spring force which contributes to force 27 compressing the cover 2 and base 3 together.

Figure 6:
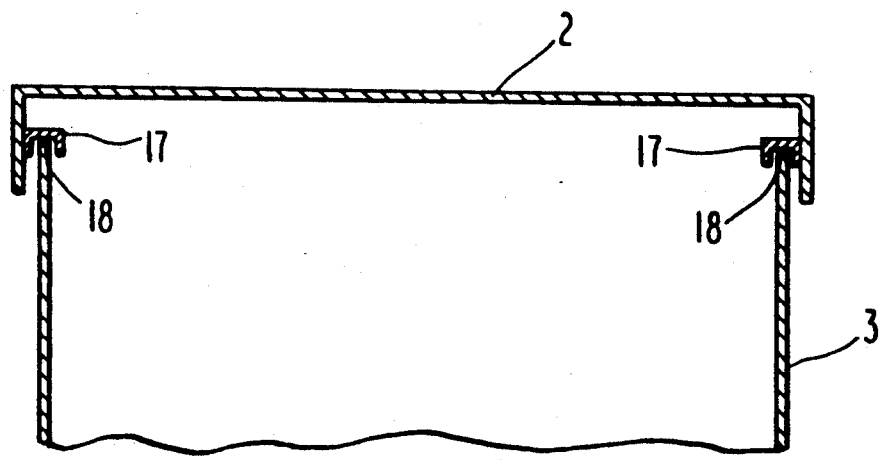
FIG. 6 is a cross-section through line VI—VI shown in FIG. 3.

In an alternative embodiment, shown in FIG. 4(b), the flange portion 11 forms a right angle with the rear wall 13. The clearance needed for elastic deformation of flange portion 11 is provided by sloping the top 16 downward at an angle C with respect to the horizontal as it extends forward from the rear edge of the lip 5. In the preferred embodiment, the angle C is approximately 3°. Note that in addition to providing clearance for flange 11 deformation, sloping the cover 3 facilitates run off of rain water. In the embodiment shown in FIG. 4(b), the top edges 18 of the side walls 23, 24 are disposed below the horizontally extending edge 12. Thus, as shown in FIGS. 4 and 6, channels 17 extend along the lip 5 at an acute angle to the top and form ledges which support the cover 2 on the edges 18 so as to obtain the proper slope of the top 16.

According to another important aspect of the current invention, the distance H (shown in FIG. 5(a)) between the slot lower edge 20 and the top edge 21 of the vertical flange portion 10 is less than the distance G (shown in FIG. 5(b)) between the bottom surface of the hinge horizontal portion 14 from which the hook 15 emanates and the inside surface of the top 16. Thus, when the cover 2 is rotated into the open position, shown in phantom in FIG. 4(a), the cover is supported at two points—the hinge 6 resting on the slot lower edge 20, with the hook 15 preventing the hinge from slipping through the slot 9, and the top 16 resting on the edge 21 of the vertical flange portion 10. This two point support allows the cover 2 to be stably supported in the open position, thereby facilitating access to the transformer. In addition, the cover 2 can be easily removed from the base 3 by lifting the cover so as to disengage the hooks 15 from the slot lower edges 20 and sliding the hinges 6 out of the slots 9.

As will be apparent to those skilled in the art, although the invention has been illustrated by showing the hinge 6 attached to the cover lip 5 and engaging a slot in the flange 8, the invention could also be practiced by attaching the hinge 6 to the rear wall of the base and allowing it to engage a slot in the cover lip. Moreover, it will also be apparent that the flange could be dispensed with and the hinges engaged into slots formed directly in the rear wall 13 of the base 3. Thus, it should be clear that the present invention may be embodied in other specific forms without departing from the spirit or central attributes thereof and, accordingly, reference should be made to the appended claims, rather than to the foregoing specification, as indicating the scope of the invention.

What is claimed:

1. An electrical transformer comprising:
   a) a tank;
   b) an enclosure extending from said tank, said enclosure having a base having a first approximately horizontally extending edge and a first approximately vertically extending member;
   c) a cover for said enclosure having a top adapted to rest on said first horizontally extending edge; and
   d) a hinge adapted to extend between said cover and said first vertically extending member, said hinge being elastically deformed when said top rests on said horizontally extending edge, whereby said hinge applies a first spring force clamping said top onto said first horizontally extending edge.

2. The transformer according to claim 1 wherein said cover has a second approximately vertically extending member extending downward from said top, said hinge attached to said second vertically extending member and adapted to engage said first vertically extending member.

3. The transformer according to claim 2 wherein said base further comprises a rear wall and a rearward extending member connecting said first vertically extending member to said rear wall, said rearward extending member being elastically deformed when said hinge engages said first vertically extending member and said top rests on said first horizontally extending edge, whereby said rearward extending member applies a second spring force clamping said top onto said first horizontally extending edge.

4. The transformer according to claim 3 wherein said rearward extending member slopes downward as it extends rearward and forms an acute angle with respect to said rear wall, thereby providing clearance between said rearward extending member and said top which permits said elastic deformation of said rearward extending member.

5. The transformer according to claim 3 wherein said top slopes downward as it extends forward from said second vertically extending member, thereby providing clearance between said rearward extending member and said top which permits said elastic deformation of said rearward extending member.

6. The transformer according to claim 5 wherein said top forms an angle of approximately 3° with respect to the horizontal when said top rests on said first horizontally extending edge.

7. The transformer according to claim 2 further comprising a second approximately horizontally extending edge formed in said first vertically extending member, and wherein said hinge has an approximately horizontally extending surface, said horizontally extending surface being in contact with said second horizontally extending edge when said hinge engages said first vertically extending member, thereby causing said elastic deformation of said hinge.

8. The transformer according to claim 7 wherein the distance from said second horizontally extending edge to said first horizontally extending edge is less than the distance from said horizontally extending surface of said hinge to said top when said hinge is in an undeformed state.

9. The transformer according to claim 7 further comprising a slot formed in said first vertically extending member, said slot having upper and lower edges, said upper edge forming said second approximately horizontally extending edge, and wherein said hinge is adapted to engage said first vertically extending member by penetrating through said slot.

10. The transformer according to claim 9 wherein said hinge has an approximately horizontally extending member forming said horizontally extending surface, a hook formed on said horizontally extending member.

11. The transformer according to claim 10 wherein said hook is adapted to rest on said lower edge of said slot when said cover is rotated upward into an open position.

12. The transformer according to claim 10 wherein said first vertically extending member has a third approximately horizontally extending edge formed therein, the distance from said hook to said top being less than the distance from said lower edge of said slot to said third horizontally extending edge, whereby said cover is supported in an open position by said hook resting on said lower edge of said slot and said cover resting on said third horizontally extending edge.

13. The transformer according to claim 1 wherein said base has a rear wall forming said first horizontally extending edge.

14. The transformer according to claim 1 wherein said hinge and said top form first and second surfaces for supporting said cover on said base in an open position.

15. In a transformer having an integral cabinet, said cabinet having a base and a cover, said base having a rear wall, said cover having a planar top, an apparatus for attaching said cover to said base, comprising:
a) a flange having a first portion extending rearwardly from said rear wall and a second portion extending downwardly from said first portion, a slot being formed in said second portion of said flange; and
b) a hinge, said hinge and said top forming opposing members, said hinge slidably and rotatably disposed in said slot, said hinge and said top adapted to be forced apart by said flange when said hinge is rotated in said slot, thereby causing said hinge to elastically deform, said elastic deformation creating a spring force clamping said cover onto said base.

16. The apparatus according to claim 15 wherein:
a) said base further comprises first and second side walls; and
b) said cover further comprises ledges formed therein for supporting said cover on said first and second side walls, said top being disposed at an acute angle to said ledges, whereby said top slopes downwardly when said ledges rest on said first and second side walls.

17. The apparatus according to claim 15 wherein said cover is adapted to be separated from said base by rotating said cover about said hinge into an open position and then sliding said hinge out of said slot.

18. A cabinet for housing electrical equipment comprising:
a) a first portion having a first approximately vertically extending member and a first approximately horizontally extending surface;
b) a second portion having a second approximately vertically extending member and second and third approximately horizontally extending surfaces; and
c) a hinge having a fourth approximately horizontally extending surface extending between said first and second vertically extending members, said hinge attached to said first vertically extending member and bearing against said third horizontally extending surface, the distance from said fourth horizontally extending surface to said first horizontally extending surface being less than the distance from said second horizontally extending surface to said third horizontally extending surface, whereby said hinge is elastically deformed, said elastic deformation exerting a spring force clamping said first and second portions together.

* * * * *